(12) United States Patent
Furuta et al.

(10) Patent No.: US 6,992,456 B2
(45) Date of Patent: Jan. 31, 2006

(54) BIPED WALKING MOBILE SYSTEM, ITS WALK CONTROLLER, AND WALK CONTROL METHOD THEREFOR

(75) Inventors: Takayuki Furuta, Tokyo (JP); Yu Okumura, Kanagawa (JP); Tetsuo Tawara, Tokyo (JP); Hiroaki Kitano, Saitama (JP)

(73) Assignee: Japan Science and Technology Agency, Saitama (JP)

( * ) Notice: Subject to any disclaimer, the term of this patent is extended or adjusted under 35 U.S.C. 154(b) by 24 days.

(21) Appl. No.: 10/495,652

(22) PCT Filed: Nov. 19, 2002

(86) PCT No.: PCT/JP02/12056

§ 371 (c)(1),
(2), (4) Date: May 17, 2004

(87) PCT Pub. No.: WO03/043789

PCT Pub. Date: May 30, 2003

(65) Prior Publication Data

US 2005/0001575 A1    Jan. 6, 2005

(30) Foreign Application Priority Data

Nov. 19, 2001  (JP)  .............................. 2001-353500

(51) Int. Cl.
  *B25J 5/00*  (2006.01)
  *G06F 19/00*  (2006.01)
(52) U.S. Cl. ........................... 318/568.12; 318/568.11; 700/245; 700/250; 901/1
(58) Field of Classification Search ........... 318/568.11, 318/568.12, 568.17, 568.2, 594; 700/245, 700/250, 900; 901/1
See application file for complete search history.

(56) References Cited

U.S. PATENT DOCUMENTS 5,206,569 A    4/1993   Ozawa (Continued)

FOREIGN PATENT DOCUMENTS

| JP | 3176705 | 4/2001 |
| JP | 2001-138271 | 5/2001 |

OTHER PUBLICATIONS

Notification of Transmittal of Copies of Translation of the International Preliminary Examination Report dated Jul. 15, 2004 and received by our foreign associate on Jul. 20, 2004.

*Primary Examiner*—Marlon T. Fletcher
*Assistant Examiner*—Patrick Miller
(74) *Attorney, Agent, or Firm*—Westerman, Hattori, Daniels & Adrian, LLP (57) ABSTRACT

The present invention provides a biped (two-footed) walking mobile system, its walk controller, and walk control method therefore, which are to realize enhancing an walk stability, as well as a consumed energy saving. A walk controller (30) of a biped walking mobile system forms a gait data by a gait forming part (33) based on parameters from a gait stabilizing part (32), and drive-controls drive means of respective joint portions (15L, 15R–20L, 20R) of each leg portion based on said gait data. In this case, the walk controller (30) is so constituted as to selectively witch a powered mode to conduct ordinary drive-control and a passive mode to drive-control the drive means similarly with passive joints, whereby drive-controlling respective joint portions. The walk controller (30) preferably switches the drive and passive modes with respect to, for example, joint portions of knee and foot portions, or switches to the powered mode for kick-up and landing during walking motion, and to the passive mode for a free foot state.

4 Claims, 6 Drawing Sheets

U.S. PATENT DOCUMENTS

| | | | | |
|---|---|---|---|---|
| 5,221,883 A * | 6/1993 | Takenaka et al. | ...... | 318/568.12 |
| 5,311,109 A * | 5/1994 | Ozawa | ................. | 318/568.11 |
| 5,355,064 A * | 10/1994 | Yoshino et al. | ........ | 318/568.12 |
| 5,378,972 A * | 1/1995 | Takenaka et al. | ...... | 318/568.22 |
| 5,404,086 A * | 4/1995 | Takenaka et al. | ...... | 318/568.12 |
| 5,432,417 A * | 7/1995 | Takenaka et al. | ...... | 318/568.12 |
| 5,915,073 A * | 6/1999 | Maeda | ....................... | 700/245 |
| 5,936,367 A * | 8/1999 | Takenaka | ............... | 318/568.12 |
| 6,289,265 B1 * | 9/2001 | Takenaka et al. | ............ | 700/245 |
| 6,294,890 B1 * | 9/2001 | Shimada et al. | ............ | 318/570 |
| 6,301,524 B1 * | 10/2001 | Takenaka | .................... | 700/245 |
| 6,472,839 B1 * | 10/2002 | Ishii et al. | ............. | 318/568.12 |
| 6,505,096 B2 * | 1/2003 | Takenaka et al. | ............ | 700/245 |
| 2002/0062177 A1 * | 5/2002 | Hannaford et al. | ......... | 700/245 |
| 2004/0044440 A1 * | 3/2004 | Takenaka | .................... | 700/245 |
| 2004/0056625 A1 * | 3/2004 | Sano et al. | ............ | 318/568.12 |

* cited by examiner

BIPED WALKING MOBILE SYSTEM, ITS WALK CONTROLLER, AND WALK CONTROL METHOD THEREFOR

TECHNICAL FIELD

The present invention relates to a biped (two-footed) walking mobile system, and more specifically to its walk controller which leads to walking with both stability and low energy consumption.

BACKGROUND ART

A biped walking robot as it is called in the art comprises a main body having at both sides of its lower part a pair of leg portions attached thereto so as to be each pivotally movable biaxially, each of the leg portions having a knee portion in its midway and a foot portion at its lower end, the foot portions being attached to their corresponding leg portions so as to be pivotally movable biaxially, joint portions supporting the leg, knee, and foot portions for pivotally moving them, respectively, a drive means for pivotally moving the joint portions, a gait former for forming gait data in accordance with a targeted motion, and a walk controller for drive-controlling the drive means based on the gait data.

In accordance with the thus constituted biped walking robot, a pre-determined walk pattern (hereinafter referred to as "gait") data is formed by a gait forming part, drive means is drive-controlled by the walk controller in accordance with the gait data, and thus the biped walking is realized by pivotally moving respective joint portions of the leg, knee, and foot portions in accordance with the pre-determined walk patterns. Here, in order to stabilize walk postures, a stabilization of a robot is targeted by ZMP (Zero Moment Point) regulation by what is called ZMP Compensation, whereby the points on the sole of a foot of the robot at each of which the composite momentum of floor reactive force and gravity becomes zero are converged to a target value.

Incidentally, the respective joint portions of such biped walking robots comprise active drive joints to be driven by drive means, or passive joints to be freely moved by being liberated from drive means.

The drive joints, which actively drive respective actuators as the drive means to pivotally moving joint portions, are to realize a walk by moving the leg and foot portions. The drive joints show such a merit as to form gait relatively freely by actively driving joint portion actuators. However, the drive joints had also the problem such as to increase energy consumption in general, and to make more complex control regulation with more joint portions in number, since they positively utilize the torque of actuators. Also, there was such a problem that a free gait formation is remarkably restricted by the ZMP criterion.

On the other hand, the passive joints are such as to pivotally move passively joint portions by such external force as gravity etc without using actuators. Since the passive joints pivotally move joint portions only by external force upon biped walking, the natural stability is realized, and ZMP is converged to soles. Further, since the passive joints save consumption energy as well as simplify control regulation, it is possible to lower a computation cost for walk control. However, since the passive joints are pivotally moved depending on external force such as gravity etc, it is difficult to realize a free pivotal movement, and a free walk.

Although the drive joints and passive joints have thus mutually opposing merits, the researches about them are conducted independently from each other, and most of the conventional biped walking robots use only the drive joints. Consequently, with the biped walking robot provided only with drive joints, a consumption energy of actuators to the drive joint portions is increased. On the other hand, the walking robots provided only with passive joints have long been known as toys, but they can not walk freely, and do not have sufficient walk stability.

Although the development is also carried out of the biped walk control combining the merits of both drive and passive joints, it is simple combination of drive and passive joints, with the joint portions as drive joints always act as drive joints, whereas the joint portions as passive joints always act as passive joints, and they are not really practical.

DISCLOSURE OF THE INVENTION

It is the object of the present invention, taking into consideration the problems mentioned above, to provide a biped walking mobile system, its walk controller, and walk control method therefor to enhance walk stability.

The above-mentioned objective is achieved in accordance with the first aspect of the present invention with a biped walking mobile system, which comprises a main body having at both sides of its lower part a pair of leg portions attached thereto so as to be each pivotally movable biaxially, each of the leg portions having a knee portion in its midway and a foot portion at its lower end, the foot portions being attached to their corresponding leg portions so as to be pivotally movable biaxially, joint portions supporting said leg, knee, and foot portions for pivotally moving them, respectively, drive means for pivotally moving the joint portions, a walk controller for forming gait data corresponding to desired motion, and for drive-controlling the drive means based on the gait data, characterized by the walk controller switching to a powered mode for kick-up and landing during walking motion, and to a passive mode for free foot state, thereby drive-controlling the joint portions of knee and foot portions.

A biped walking mobile system in accordance with the present invention is preferably provided with the said main body which is the upper body of a humanoid robot, and a head portion and both hand portions are attached thereto. A biped walking mobile system in accordance with the present invention is preferably such that a compliance control is conducted in the passive mode by the said walk controller.

The above-mentioned objective is also achieved in accordance with the second aspect of the present invention with the biped walking mobile system, which comprises a main body having at both sides of its lower part a pair of leg portions attached thereto so as to be each pivotally movable biaxially, each of the leg portions having a knee portion in its midway and a foot portion at its lower end, the foot portions being attached to their corresponding leg portions so as to be pivotally movable biaxially, the joint portions supporting said leg, knee, and foot portions for pivotally moving them, respectively, the drive means for pivotally moving said joint portions, a walk controller for forming gait data corresponding to a targeted motion, and for drive-controlling said drive means in accordance with said gait data, characterized by the said walk controller switching to a powered mode for kick-up and landing during walking motion, and to a passive mode for free foot state, thereby drive-controlling the joint portions of knee and foot portions.

A walk controller of the biped walking mobile system in accordance with the present invention is preferably such that a compliance control is conducted in the passive mode by the said walk controller.

The above-mentioned objective is further achieved in accordance with the third aspect of the present invention by the walk controlling method of the biped walking mobile system, which comprises a main body having at both sides of its lower part a pair of leg portions attached thereto so as to be each pivotally movable biaxially, each of the leg portions having a knee portion in its midway and a foot portion at its lower end, the foot portions being attached to their corresponding leg portions so as to be pivotally movable biaxially, the joint portions supporting said leg, knee, and foot portions for pivotally moving them, respectively, the drive means for pivotally moving said joint portions, where said walk controlling method of the biped walking mobile system drive-controls said drive means in accordance with a gait data formed correspondingly to a targeted motion, characterized by said walk controlling method switching to a powered mode for kick-up and landing during walking motion, and to a passive mode for free foot state, thereby drive-controlling the joint portions of knee and foot portions.

A walk controlling method of the biped walking mobile system in accordance with the present invention is preferably such that a compliance control is conducted in the passive mode by the said walk controller.

In accordance with the above-described aspect, a walk controller forms a gait data corresponding to the targeted motion, and drive-controls the drive means based on said gait data. In this case, since the walk controller drive-controls a drive means while properly switching drive and passive modes, the joint portions drive-controlled by the drive means by drive mode act as drive joints, while the joint portions drive-controlled by the drive means by passive mode act as passive joints. Thus, since the same joint portion acts as a drive or the passive joint drive-controlled by either drive or passive mode, the drive means is drive-controlled usually by drive mode, and drive-controlled by passive mode when necessary for the joint portions of, for example, knee and foot portions, upon walking of a biped walking mobile system, whereby only the merits of the drive and the passive joints are utilized, while defects can be eliminated. Consequently, natural stability by passive joints can be introduced into walking, and ZMP is automatically converged to soles, while energy consumption is saved, and the torque is lowered. Thus, ZMP is surely converged to soles at any gaits, and the walk stability is improved for a biped walking mobile system.

With respect to the joint portions of knee and foot portions, since the modes are switched to either powered or passive mode upon necessity when said joint portions of knee and foot portions are driven upon walking, the walk stability can be attained. In case to switch to the powered mode for kick-up and landing during walking action, and to the passive mode for free foot state, a shock can be absorbed by supplying the energy required for free foot state upon kick-up, and by absorbing energy upon landing. In case to conduct compliance control in the passive mode, the joint portions drive-controlled as drive joints by drive means for joint driving are drive-controlled by compliance control, and act also as passive joints.

BRIEF DESCRIPTION OF THE DRAWINGS

The present invention will better be understood from the following detailed description and the drawings attached hereto showing certain illustrative forms of embodiment of the present invention. In this connection, it should be noted that such forms of embodiment illustrated in the accompanying drawings hereof are intended in no way to limit the present invention but to facilitate an explanation and an understanding thereof. In the drawings.

BEST MODES FOR CARRYING OUT THE INVENTION

Hereinafter, the present invention will be described in detail with reference to suitable forms of embodiment thereof illustrated in the drawing figures.

Figure 1:
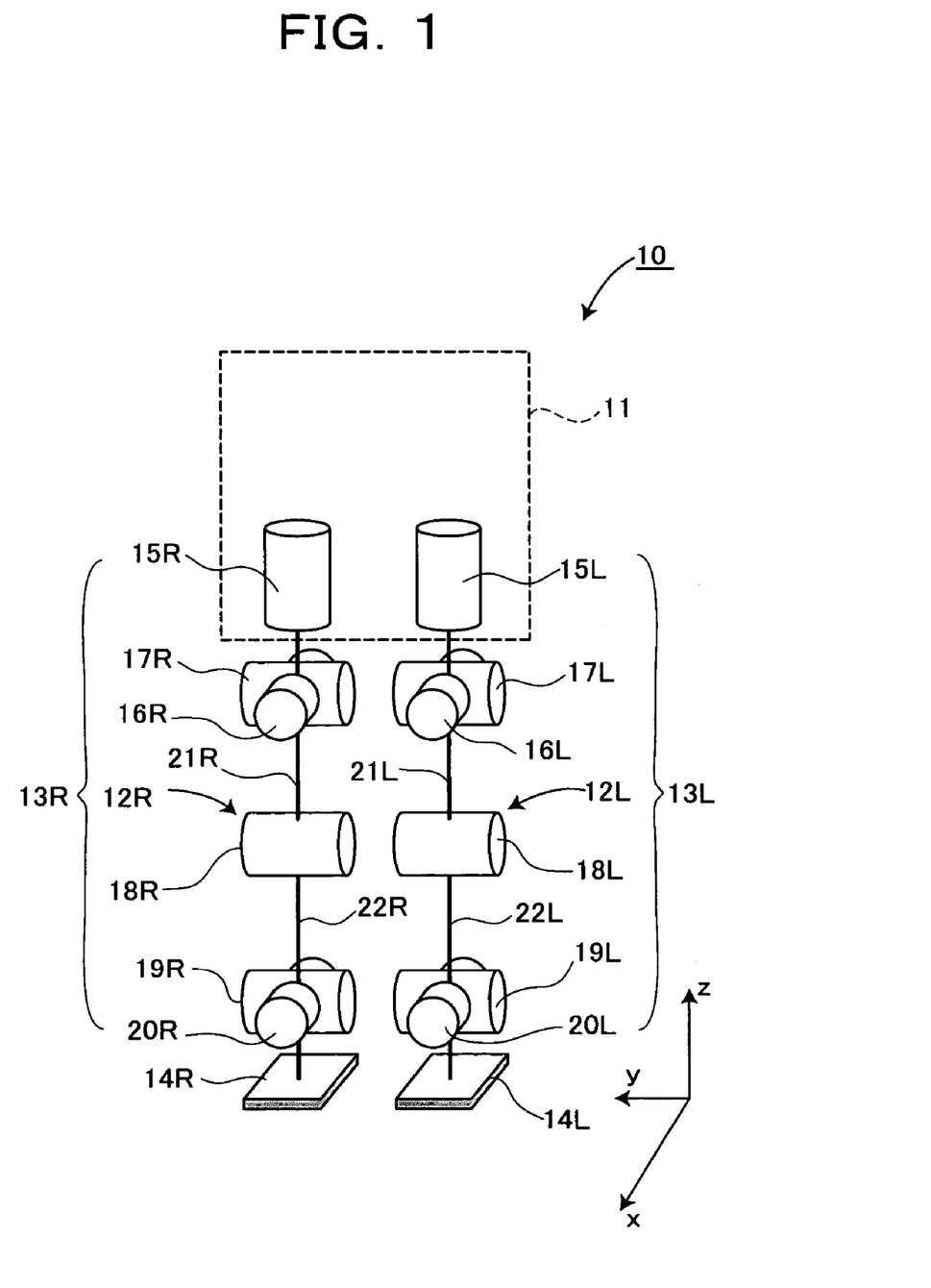
FIG. 1 is a schematic view illustrating a mechanical makeup of a biped walking robot according to the present invention as one form of embodiment thereof.
Figure 2:
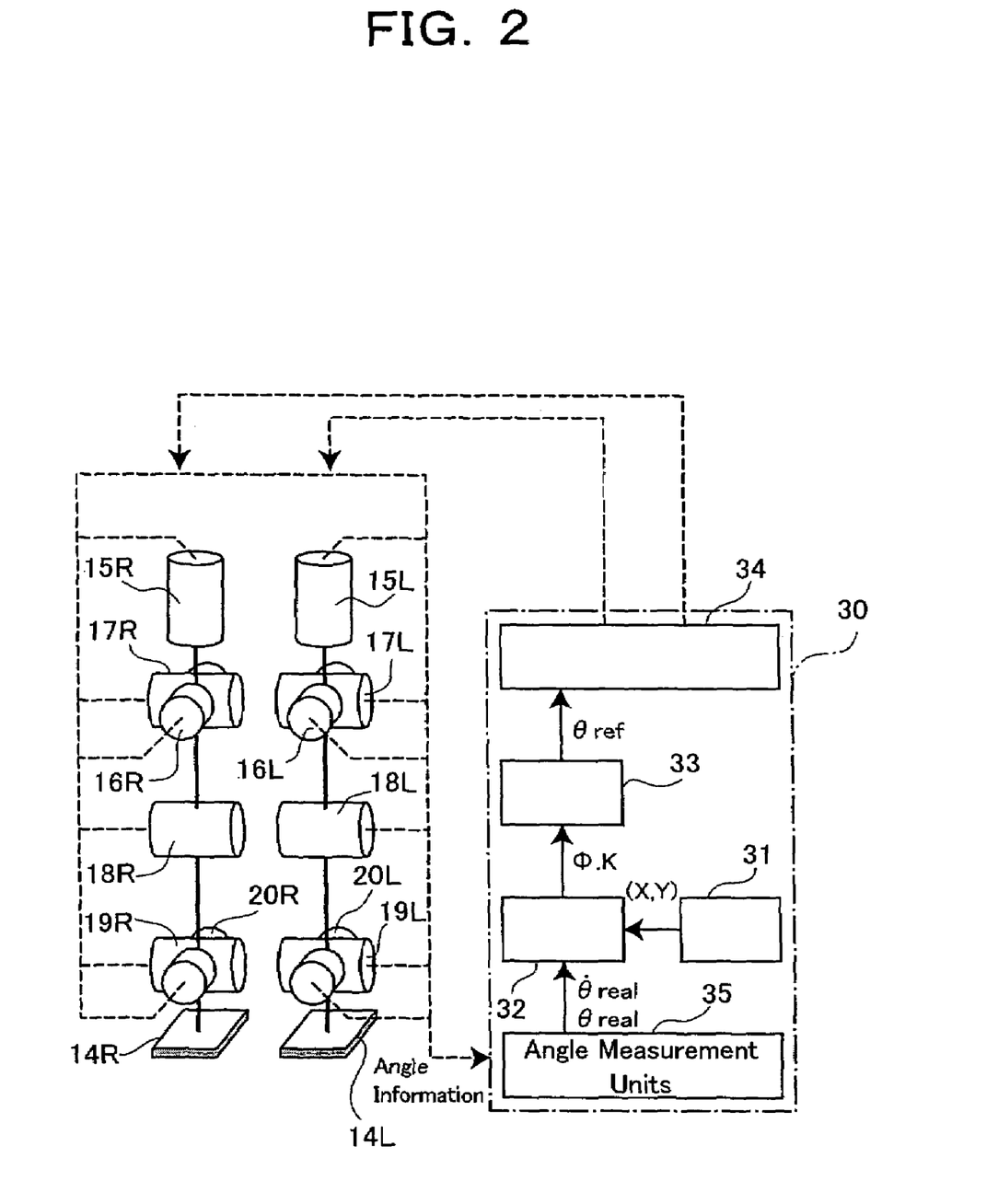
FIG. 2 is a block diagram illustrating a walk controller of the biped walking robot shown in FIG. 1.

FIG. 1 and FIG. 2 show the makeup of an embodiment of a biped walking robot with a biped walking mobile system applied thereto in accordance with the present invention. Referring to FIG. 1, the biped walking robot 10 includes an upper body 11 which is a main body having at both sides of its lower part a pair of leg portions 13L and 13R attached thereto, each of the leg portions having a knee portion 12L, 12R in its midway, and a foot portion 14L, 14R at its lower end.

Here, each of the leg portions 13L, 13R has six (6) joint portions, namely in the order from above, the joint portion 15L, 15R for the leg portion rotation of a waist (around z axis) with respect to the upper body 11, joint portions 16L, 16R for the roll direction of the waist (around x axis), joint portions 17L, 17R for the pitch direction of the waist (around y axis), joint portions 19L, 19R for the pitch direction of an ankle portion with respect to the foot portion 14L, 14R, and joint portions 20L, 20R for the roll direction of an ankle portion. Further, each joint portions 15L, 15R to 20L, 20R is provided with a joint driving motor (an actuator). Thus, a waist joint comprises joint portions 15L, 15R, 16L, 16R, 17KL, and 17R, and a foot joint comprises joint portions 19L, 19R, 20L and 20R.

Further between the waist and knee joints, they are connected with thigh links 21L, 21R, and between the knee and the foot joints, they are connected with the lower thigh links 22L, 22R. Thus, the leg portions 13L, 13R and the foot portions 14L, 14R at both sides, left and right, of the biped walking robot 10 have six (6) degrees of freedom, respectively, and it is so made up to be capable of walking at will in a three dimensional space by drive-controlling these twelve joint portions during walk with respective drive motors at appropriate angles, and by giving desired motions to whole leg portions 13L, 13R, and the foot portions 14L, 14R. Here, the upper body 11 is illustrated like a mere box, but actually it may be provided with a head portion and two hands.

FIG. 2 illustrates a walk controller 30 of the biped walking robot 10 shown in FIG. 1. In FIG. 2, the walk controller 30 is provided with a motion planning part 31 to designate a position of next step, a gait stabilizing part 32 to calculate a parameter for the gait formation based on the said position of next step, a gait forming part 33 to form the gait data based on the parameter from the gait stabilizing part 32, a controlling part 34 to drive-control a drive means, namely the above-mentioned respective joint portions, that is, joint driving motors 15L, 15R, to 20L, 20R based on the gait data, and an angle measuring unit 35 to detect the angles of respective joint portions of the robot. In coordinating the biped walking robot 10, use is here made of an xyz-coordinate system with an x-axis extending in an antero-posterior direction (frontward +), a y-axis extending in a horizontal direction (inward +), and a z-axis extending in a vertical direction (upward +).

The motion planning part 31 designates the road surface planar coordinate (X, Y) from the ankle center of the supporting leg at next step corresponding to the desired motion. The gait stabilizing part 32 is to calculate the parameter for gait formation based on the road surface planar coordinate (X, Y). Here, the motion planning part 31 and the gait stabilizing part 32 act as a pair, and conduct two samplings at the start of walk (kick-up) and landing in one period of step, and hold these samplings information. The gait stabilizing part 32 conducts calculation of parameters for gait formation from road surface planar coordinate (X, Y), referring to a posture information θ real from an angle measurement unit 35 described below.

The gait forming part 33 is to form, based on the parameters from the gait stabilizing part 32, the vectors θ ref and mode signals as the gait data including a target angle orbital, a target angle velocity, and a target angle acceleration of respective joint portions 15L, 15R to 20L, 20R necessary for the walk of the biped walking robot 10.

The controlling part 34 is to form the control signals of respective joint drive motors that is the angular vectors θ, and to drive-control respective joint drive motors based on the vectors θ ref and mode signals as the gait data from the gait forming part 33. The controlling part 34 drive-controls like conventional drive joints during the powered mode so as to supply or to absorb energy respective joint drive motors. The controlling part 34 also drive-controls like conventional passive joints during the passive mode by conducting free movement by utilizing the energy already supplied to respective joint drive motors.

The angle measurement unit 35 is to measure angular positions of respective joint drive motors, that is, states information about an angle and an angular velocity namely postures information θ real of the robot 10 by inputting an angular information of respective joint drive motors. This is inputted by, for example, a rotary encoder or the like provided to the joint drive motors of respective joint portion 15L, 15R to 20L, 20R, thereby outputting to the gait stabilizing part 32. The angle measurement unit 35 acts as a pair with the gait forming part 33, and conducts samplings.

Figure 3:
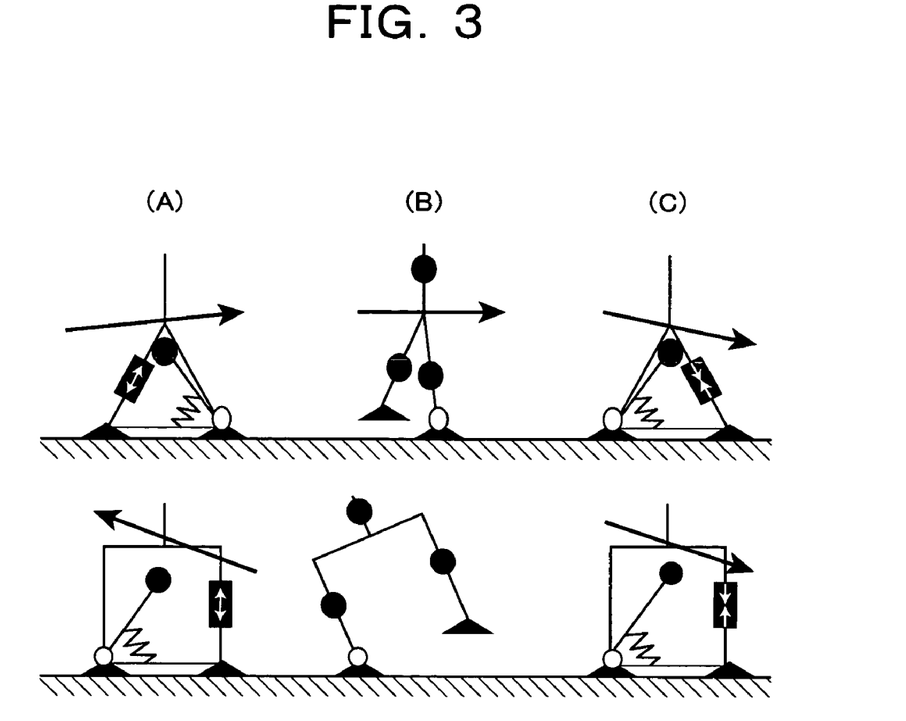
FIG. 3 is a side and a front view illustrating three phases of walking of the biped walking robot shown in FIG. 1.

Here the walk of the biped walking robot 10 can be treated, as shown in FIG. 3, as decomposed temporally to three phases with respect to one step period.

FIG. 3(A) shows the two leg supporting period as the Phase 1 in which both feet are in contact with the ground, that is, the kick-up time when the hind foot is about to move forward by kick-up. The Phase 1 is a supplying energy period to supply the energy necessary for the walk system. Here, the walk system of both legs are drive-controlled by the power mode as 1-link spring system.

FIG. 3(B) shows the single leg supporting period as the Phase 2 in which one foot is in contact with the ground, that is, the free leg time when one foot is floating from the ground. In Phase 2, the joint portions of ankle and knee portions are drive-controlled as passive joints to conduct free movement by the energy supplied previously to the free leg. Here, the walk system of both legs is drive-controlled by the passive mode as 3-link system.

FIG. 3(C) shows the two leg supporting period as the Phase 3 in which both feet are in contact with the ground again, that is, the landing time when the forward foot is about to land. Phase 3 is an absorbing energy period to absorb energy for landing from the walk system. Here, the walk system of both legs are drive-controlled by powered mode as 1-link spring system.

During continuous walk, next Phase 1 follows by the left and right leg exchange after Phase 3. Therefore, the gait stabilizing part 32 is to calculate the energy necessary for Phase 2 of next step at the end of the Phase 3, referring to postures and states of the robot 10.

Here, explanation is made of calculation of the energy necessary for the Phase 2.

Figure 4:
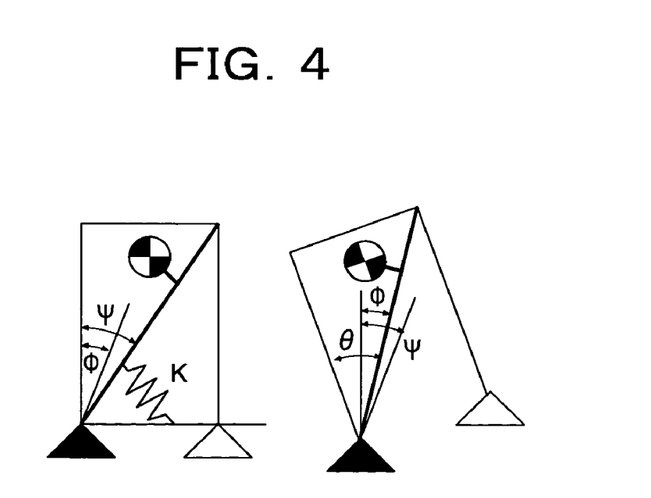
FIG. 4 is a schematic view illustrating an energy loss in phase 2 of the biped walking robot shown in FIG. 1.

First, the gait stabilizing part 32 determines, as shown in FIG. 4, a spring stiffness K or a natural length of the rotary spring φ as the parameter in the Phase 1 from the road surface planar coordinate (X, Y) from the motion planning part 31, and the vector θ real as postures information from the angle measurement unit 35.

Figure 5:
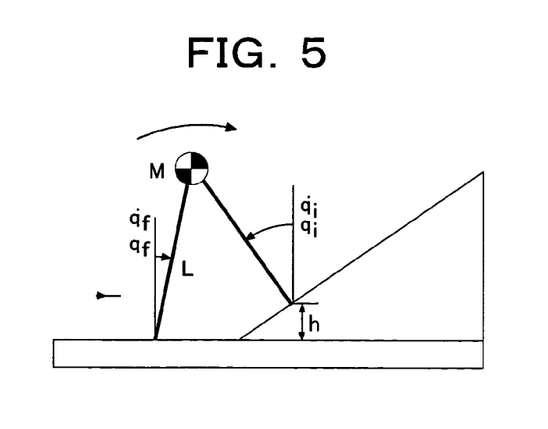
FIG. 5 is a view illustrating a leg switching model of the biped walking robot shown in FIG. 1.

Here, the explanation is made of the lost and the gained energies of walk system in the Phase 3. The energy loss by environment in Phase 3 is calculated by simple leg switching model shown in FIG. 5. In FIG. 5, the energy loss Eex-loss is calculated by the geometrical leg switching model as 2-link 1 mass point model, Equation (1) is obtained.

$$E_{ex\text{-}loss} = \frac{M}{2}L^2\dot{q}_f^2\{1 - \cos^2(q_i + q_f)\}, \quad (1)$$

where Lf is the length before leg switching, Li the length after leg switching, qf the angle before leg switching, and qi the angle after leg switching.

More precisely, the energy loss Eall-loss in one step period is $$E_{all\text{-}loss} = E_{ex\text{-}loss} + E_{vi\text{-}loss} + E_{di\text{-}loss} \quad (2),$$

where Evi-loss is an energy loss by a friction of a joint drive motor, and Edi-loss is external disturbances expressed as the loss of internal energy.

Since the results described above can be applied to both xz and yz planes, a walk motion can be continued by supplementing Eall-loss mentioned above to xz and yz planes, respectively.

On the other hand, in case that the energy is injected to the walk system in Phase 2 for walking downhill, for example, it may also be possible to generate the energy loss as desired by choosing landing position by calculating similarly excessive energy, using Equation (1) shown above, and by determining next foot position. In order to supplement such energy loss, the gait stabilizing part 32 is to maintain a walk stability, for constantly controlling the energy of the walk system, by calculating the above mentioned parameters K and φ irrespective of landing position.

The explanation is next made of drive-control by the controlling part 34. The controlling part 34 is, in case that the mode signal is passive, to conduct a virtual compliance control, and a virtual actuator control in case of the powered mode.

Figure 6:
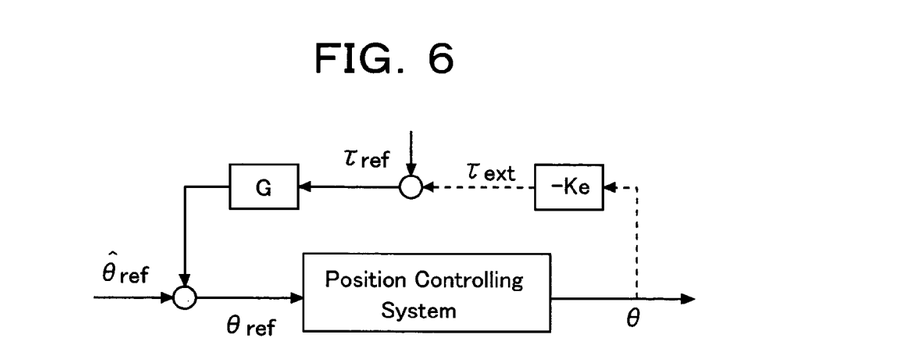
FIG. 6 is a view illustrating a control regulation of the compliance control of a walk controller of the biped walking robot shown in FIG. 1.

Here the virtual compliance control is conducted as described below by using a control method of impedance control. Namely as shown in FIG. 6, the vector θ ref is input into the controlling part 34 as the gait data, and the angle vector θ is output from the controlling part 34 to joint drive motors. This angle information θ is converted to τ ext by environment stiffness matrix (–Ke), τ ref from outside being added, and is input into a power control opposite angle compensator matrix G.

In the power control opposite angle compensator matrix G, calculation is made, $$G=(s^2M+sD+K)^{-1} \quad (3),$$

and is added to vectors θ ref, and is fed back.

Thus, for τ ref=0 for example, the control regulation expressed by $$\theta_{ref}=(s^2M+sD+K)^{-1}\tau_{ext} \quad (4)$$

is obtained.

Here, for the passive joint, an inertia matrix M is adjusted to actual motion with a stiffness coefficient matrix K=0, and a viscosity coefficient matrix D=0. For example, if the 1-link model is utilized as motion, Equation (3) mentioned above becomes to be one dimensional equation, and the calculation in real time becomes readily possible.

Thus, in the passive mode, the joint parts consisting of the corresponding drive joints can be operated as passive joints by utilizing specific system of the impedance control, and conducting the virtual compliance control of joint drive motors. By this process, the walk system can be made more stable.

Figure 7:
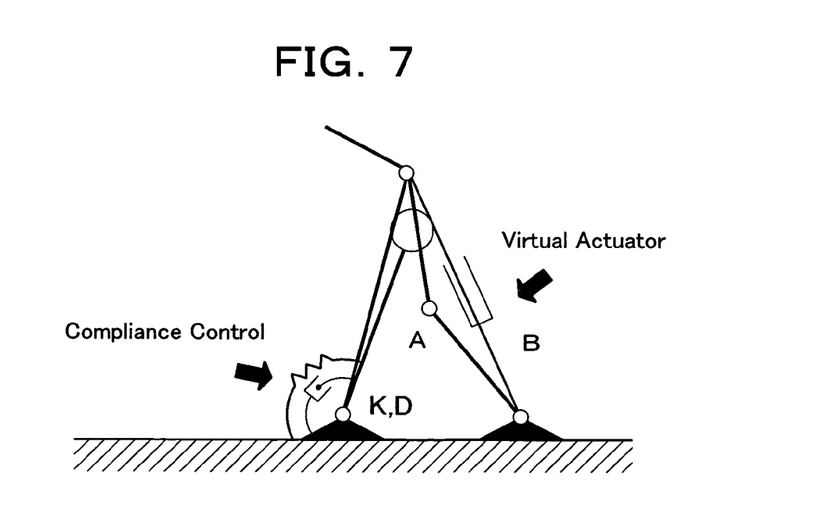
FIG. 7 is a schematic view illustrating a virtual actuator control of the biped walking robot shown in FIG. 1.

On the other hand, as for the virtual actuator control, as shown in FIG. 7 for example, if the actuator shown as the symbol A is desired to realize, its motion is realized actually by drive-control of the actuator shown as the symbol B. By this process, it becomes possible to realize same motion by, for example, reducing the degree of freedom, as well as a ZMP stability is guaranteed because it becomes unnecessary to apply a torque to a supporting leg ankle to drive.

The illustrated biped walking robot 10 of the present invention is constructed as described above, and its walk motion is conducted as below.

First, the motion planning part 31 designates, responsive to the required motion, the road surface planar position (X, Y) from the center of the supporting leg ankle for next step, and outputs to the gait stabilizing part 32. By this process the gait stabilizing part 32 calculates the parameters for the gait formation from the road surface planar position (X, Y) and the posture information θ real from the angle measurement unit 35, and outputs to the gait forming part 33. Then the gait forming part 33 forms vectors θ ref as gait data based on the parameters from the gait stabilizer 32, and outputs to the controlling part 34. By this process, the controlling part 34 forms a control signals for respective joint drive motors, that is, angle vectors θ based on vectors θ ref, and drive-controls the joint drive motors of respective joint portions by either the powered or passive mode based on these angle vectors and mode signals. Thus, the biped walking robot 10 conducts the walk motion corresponding to the required motion.

In this case, upon drive-controlling respective joint drive motors for the biped walking robot 10, since the gait stabilizing part 32 forms the parameters required for gait formation from the road surface planar position (X, Y), referring to postures information of the robot at that moment, the gait data formed by the gait forming part 33 is formed from postures and states of the robot at that moment so as to supply necessary energy. Therefore, in the single leg supporting period during which one leg portion is raised from the ground to become a free leg upon biped walking, the joint portions of the knee and the foot joint portions of the one leg portion can perform a free movement as passive joints. Then, since the energy supply is not needed to the joint drive motors acting as passive joints, energy consumption is saved. Also, since the control calculation for the joint drive motors acting as passive joints is not necessary, the calculation cost is saved, as well as the formation gait data can be made easy.

The explanation is next made of a numerical simulation and field tests of the biped walking robot 10 in accordance with the present invention.

Figure 8:
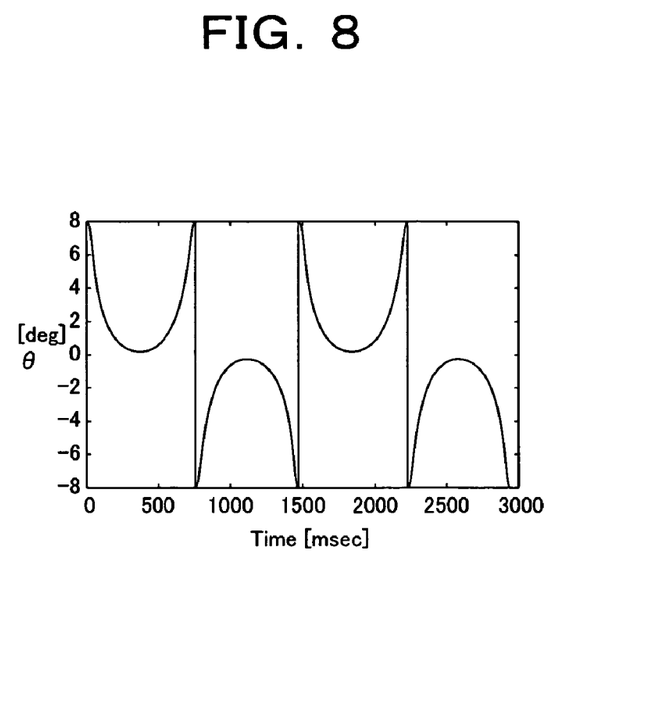
FIG. 8 is a graph showing a change of $\theta$ calculated by numerical simulation of stepping action for the biped walking robot shown in FIG. 1.
Figure 9:
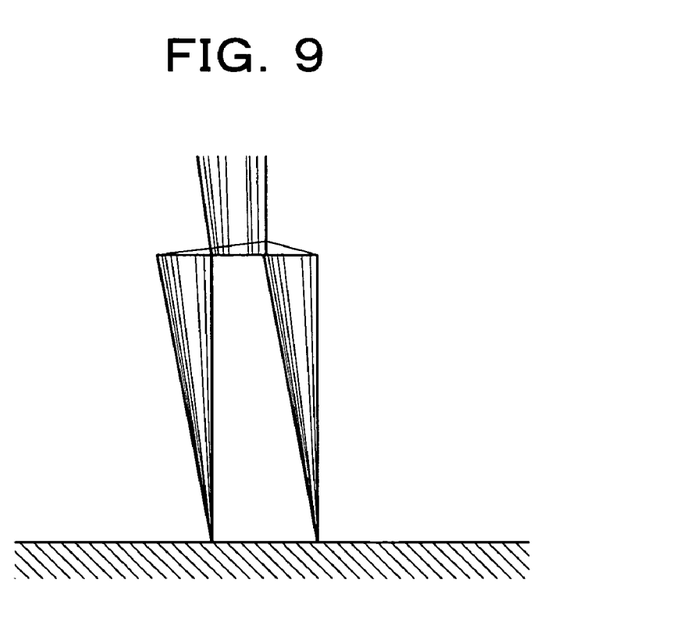
FIG. 9 is a stick diagram in the numerical simulation of FIG. 8.

First shown is the result of the numerical simulation of the real gait formation on yz plane. For the biped walking robot 10 to dynamically stamp on yz plane, the gait of 4 walk period was formed in the above-mentioned the Phases 1 and 3 with the spring constant $1.62 \times 10^{31}$ $^1$(Nm/degree) and the natural length of spring 6 degrees. As a result, the change of θ was obtained as shown in FIG. 8. And the stick diagram of the formed gait is as shown in FIG. 9. It should be evident from these that about 120 msec at the beginning and the end of each walk period is the two leg supporting period. Therefore, since the starting and ending parts of each walk period show a smooth S-shaped curve, which is different from the trajectory of general 1-link system, the load to joint drive motors does not lower to become discontinuous, and the walk system becomes stable.

Figure 10:
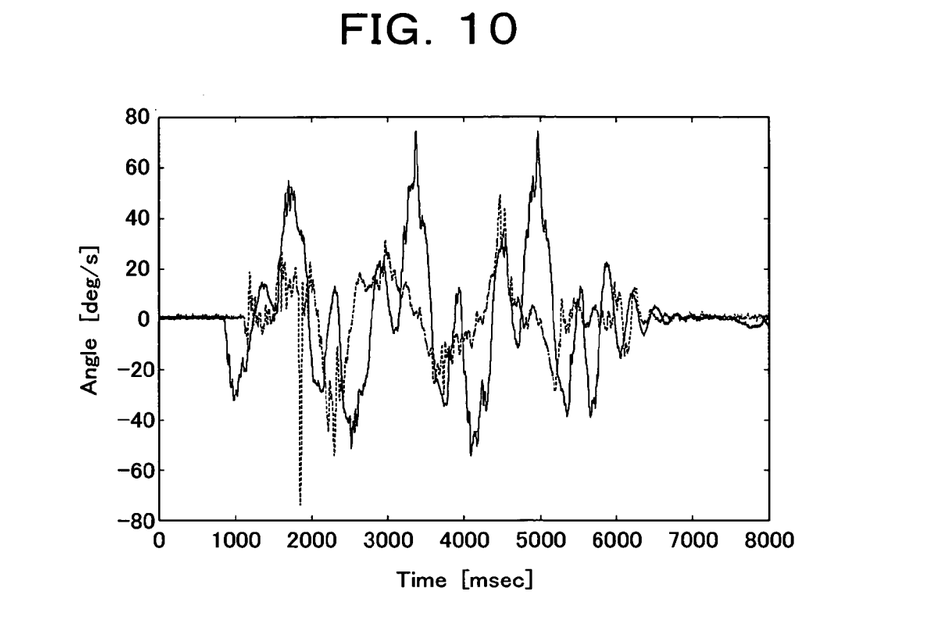
FIG. 10 is a view illustrating an angle change of the robot main body in yz-plane upon field test of the biped walking robot shown in FIG. 1.
Figure 11:
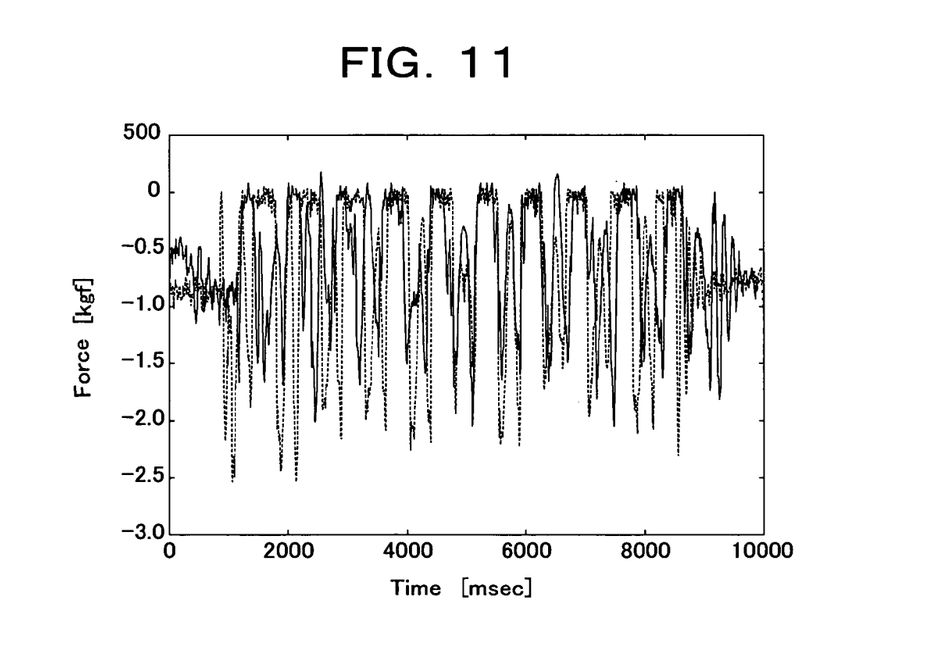
FIG. 11 is a graph showing a change of floor reactive force of the robot sole upon field test of FIG. 10.

Shown next is the result of field tests. As the biped walking robot 10 for field tests, the robot is used of which the degree of freedom of the lower body is 12, the total weight 2.0 kg, the total height 35.6 cm, and which is provided with a servo-motor for a model of a maximum torque ±1.27 Nm as joint drive motors for respective joint portions. And the angle on yz plane of the robot main body 11 was measured by making it to perform normal stamping motion of 8 walk periods. As a result, as shown in FIG. 10, in case of the walk control by the Phases 1, 2, and 3 (shown by solid curve) of the present invention, it should be evident that the stable angular velocity trajectory is shown compared with the case of the walk control by the Phase 2 only (shown by dotted curve). That is, it should be obvious that the continuous walk stability is guaranteed by the "kick-up" by the energy supply in the Phase 1, whereby the effectiveness is confirmed for walk control in accordance with the present invention.

Here, the floor reactive force of the sole during the motion mentioned above was measured by, for example, the 6 axis force sensor, and the change of the floor reactive force was obtained as shown in FIG. 10. From this, it should be evident that the energy absorbing motion in the Phase 3 acts in similar manner as shock absorption, as well as the floor reactive force shows the relatively stable trajectory in each walk period of stamping motion, whereby the effectiveness is confirmed for energy absorbing motion in the Phase 3.

Thus, in accordance with embodiment of the present invention of the biped walking robot 10, by drive-controlling the joint portions of knee and foot portions, for example, as powered or passive joints appropriately switching the mode of the motion, the walk stability can be improved by flexibility of walk control, as well as the power consumption for walk motion can be saved.

Although the present invention has been described in certain forms of embodiment when applied to a biped walking robot, it should be obvious that the present invention is applicable to any biped walking mobile system with other various apparatus supported with two legs, and walkable with these two legs.

INDUSTRIAL APPLICABILITY

According to the present invention as described above, thus, since the same joint portion acts as a powered or a passive joint drive-controlled by either powered or passive mode, the drive means is drive-controlled usually by the powered mode, and drive-controlled by the passive mode when necessary for the joint portions of, for example, knee and foot portions, upon walking of a biped walking mobile system, whereby both merits of the powered and the passive joints are utilized, while defects can be eliminated. Consequently, a natural stability by passive joints can be introduced into walking, and a ZMP is automatically converged to soles, while the energy consumption is saved, and the torque is lowered. Thus, the ZMP is surely converged to soles at any gaits, and the walk stability is improved for the biped walking mobile system.

Thus, according to the present invention, an extremely superb biped walking mobile system, its walk controller, and the method of walk control, which enhance walk stability are provided.

What is claimed is:

1. A biped walking mobile system comprising;
   a main body having at both sides of its lower part a pair of leg portions attached thereto so as to be each pivotally movable biaxially, each of the leg portions having a knee portion in its midway and a foot portion at its lower end, the foot portions being attached to their corresponding leg portions so as to be pivotally movable biaxially, the joint portions supporting said leg, knee, and foot portions for pivotally moving them, respectively, a drive means for pivotally moving said joint portions, and a walk controller forming gait data corresponding to desired motion, and drive-controlling said drive means based on said gait data,
   wherein said walk controller switches the mode to a powered mode for kick-up and landing during walking action, and switches to a passive mode for free foot state, thereby drive-controlling the joint portions of knee and foot portions, and
   said walk controller conducts compliance control in the passive mode.

2. A biped walking mobile system as set forth in claim 1, characterized in that,
   said main body is an upper body of a humanoid robot provided with a head portion and two hand portions.

3. A walk controller for a biped walking mobile system, said biped walking mobile system comprising a main body having at both sides of its lower part a pair of leg portions attached thereto so as to be each pivotally movable biaxially, each of the leg portions having a knee portion in its midway and a foot portion at its lower end, the foot portions being attached to their corresponding leg portions so as to be pivotally movable biaxially, the joint portions supporting said leg, knee, and foot portions for pivotally moving them, respectively, and a drive means for pivotally moving said joint portions, said walk controller comprising:
   a motion planning part to designate a position of next step,
   a gait stabilizing part to calculate a parameter for gait formation based on the said position of next step,
   a gait forming part to form gait data based on the parameter from said gait stabilizing part,
   a controlling part to drive-control said drive means based on the gait data, and
   an angle measuring unit to detect the angles of respective joint portions of the robot, wherein
   said walk controller switches the mode to a powered mode for kick-up and landing during walking action, and switches to a passive mode for free foot state, thereby drive-controlling the joint portions of knee and foot portions, and
   said walk controller conducts compliance control in the passive mode.

4. A method of walk control for a biped walking mobile system which comprises;
   a main body having at both sides of its lower part a pair of leg portions attached thereto so as to be each pivotally movable biaxially, each of the leg portions having a knee portion in its midway and a foot portion at its lower end, the foot portions being attached to their corresponding leg portions so as to be pivotally movable biaxially, the joint portions supporting said leg, knee, and foot portions for pivotally moving them, respectively, a drive means for pivotally moving said joint portions,
   said method of walk control for a biped walking mobile system drive-controlling said drive means based on gait data formed in correspondence to desired motion,
   wherein said method of walk control switches the mode to a powered mode for kick-up and landing during walking action, and switches to a passive mode for free foot state, thereby drive-controlling the joint portions of knee and foot portions, and
   a compliance control is conducted in the passive mode.

* * * * *